June 4, 1940. J. TJAARDA 2,203,344
WHEEL SUSPENSION
Filed March 12, 1938 3 Sheets-Sheet 1

INVENTOR
John Tjaarda.
BY Dike, Calver & Gray
ATTORNEYS.

June 4, 1940.  J. TJAARDA  2,203,344
WHEEL SUSPENSION
Filed March 12, 1938   3 Sheets-Sheet 2

INVENTOR
John Tjaarda.
BY Dike, Calver & Gray
ATTORNEYS.

June 4, 1940.                J. TJAARDA                2,203,344
                         WHEEL SUSPENSION
                    Filed March 12, 1938          3 Sheets-Sheet 3
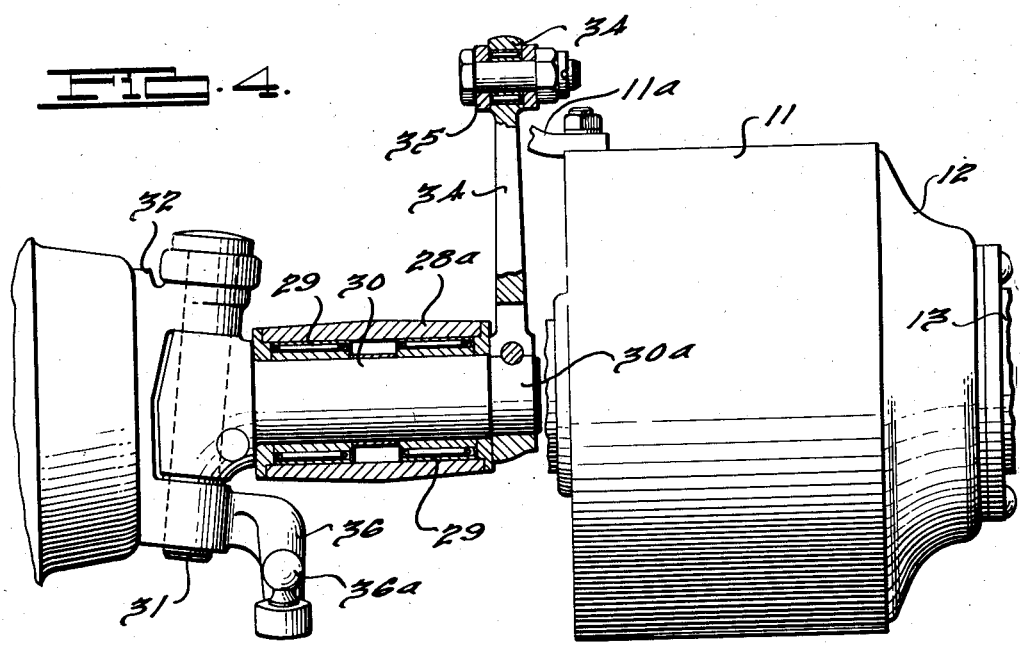
Fig. 4.
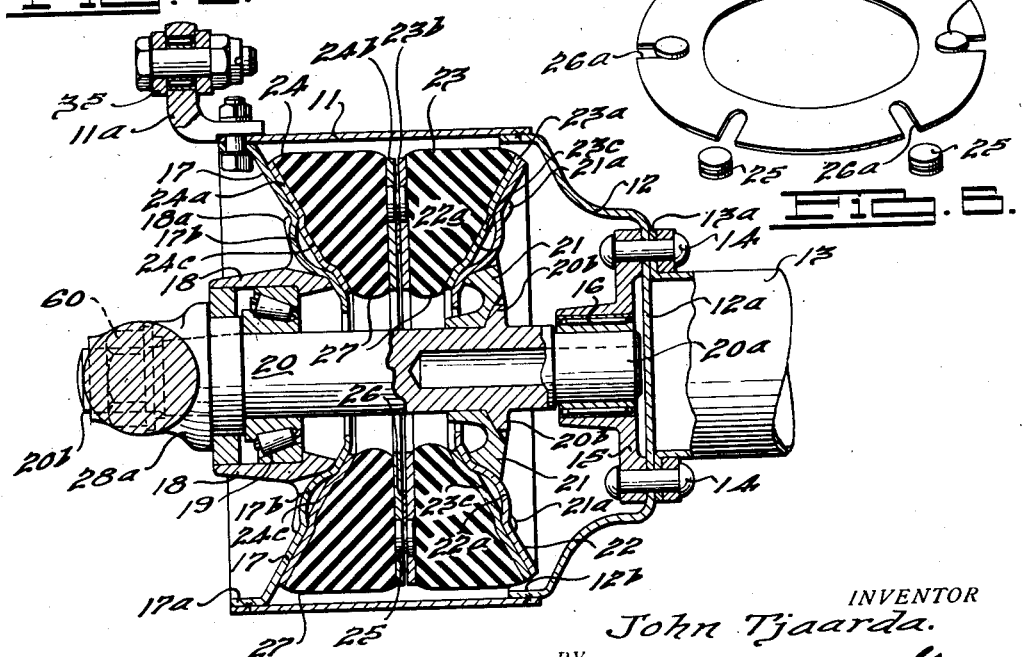
Fig. 5.
Fig. 6.
INVENTOR
John Tjaarda.
BY Dike, Calver & Gray
ATTORNEYS Patented June 4, 1940

2,203,344

UNITED STATES PATENT OFFICE 2,203,344

WHEEL SUSPENSION

John Tjaarda, Birmingham, Mich., assignor to Briggs Manufacturing Company, Detroit, Mich., a corporation of Michigan Application March 12, 1938, Serial No. 195,473

13 Claims. (Cl. 267—21)

This invention relates to wheel suspensions for vehicles and more particularly for motor vehicles.

One of the objects of the present invention is to provide an improved wheel suspension for motor vehicles having individually sprung wheels, in which the resiliency of suspension is effected by the provision of members made of highly resilient material, such as rubber, which members are distorted on the upward movement of the wheels.

Another object of the invention is to provide an improved wheel suspension of the foregoing character in which the rubber members are subjected chiefly to compression and/or shear stresses.

Still another object of the invention is to provide an improved wheel suspension in which the movements of the steering wheels in a vertical plane, because of irregularities of the road, do not affect the steering angle of the wheels.

A further object of the invention is to provide an improved wheel suspension with individually sprung wheels in which suspension the number of pivoted connections is reduced to a minimum, and yet the wheels are guided relatively to the frame or body of the vehicle without permitting appreciable variation in the track, caster, camber, or toe-in.

A still further object of the invention is to provide a wheel suspension in which the steering wheels are arranged in substantially vertical planes whereby the wear of the rubber tire on both sides thereof is substantially equalized and yet no excessive effort for turning the steering wheels is necessary.

A still further object of the invention is to provide a wheel suspension device for a motor vehicle, which utilizes resilient means possessing certain shock absorbing characteristics.

A still further object of the invention is to provide an improved spring device including members made of a resilient material such as rubber, which has different resistance characteristics depending upon the magnitude of the deflecting impacts.

A still further object of the invention is to provide a spring device of the foregoing character in which a considerable portion of the energy of impacts is absorbed therein by conversion into heat and dissipation of the same, rather than being stored in said device and increasing its rebound.

It is an added object of the present invention to provide an improved wheel suspension for a motor vehicle, which is simple in construction, dependable in operation, and is relatively inexpensive to manufacture.

Other objects of this invention will appear in the following description and appended claims, reference being had to the accompanying drawings forming a part of this specification wherein like reference characters designate corresponding parts in the several views.

Fig. 4 is a view, partly in section, taken on the line 4—4 of Fig. 2, looking in the direction of the arrows.

Fig. 5 is a longitudinal sectional view of the left hand drum, taken on the line 5—5 of Fig. 2, looking in the direction of the arrows.

Fig. 6 is a perspective view of the coupling ring interposed between the compressed rubber members of the suspension unit.

Figure 1:
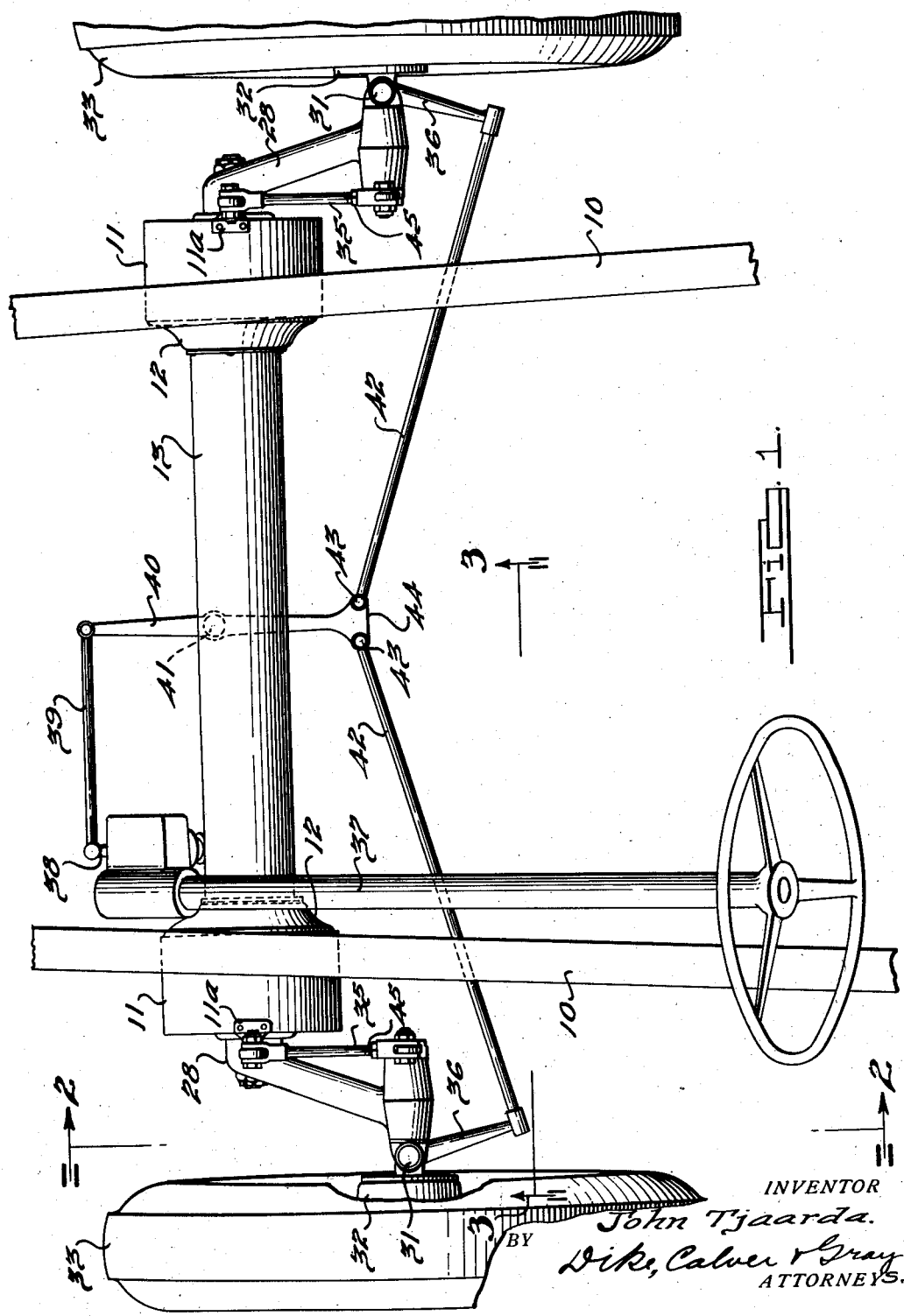
Fig. 1 is a top view of the front part of a motor vehicle chassis with a wheel suspension constructed in accordance with one embodiment of the invention.
Figure 2:
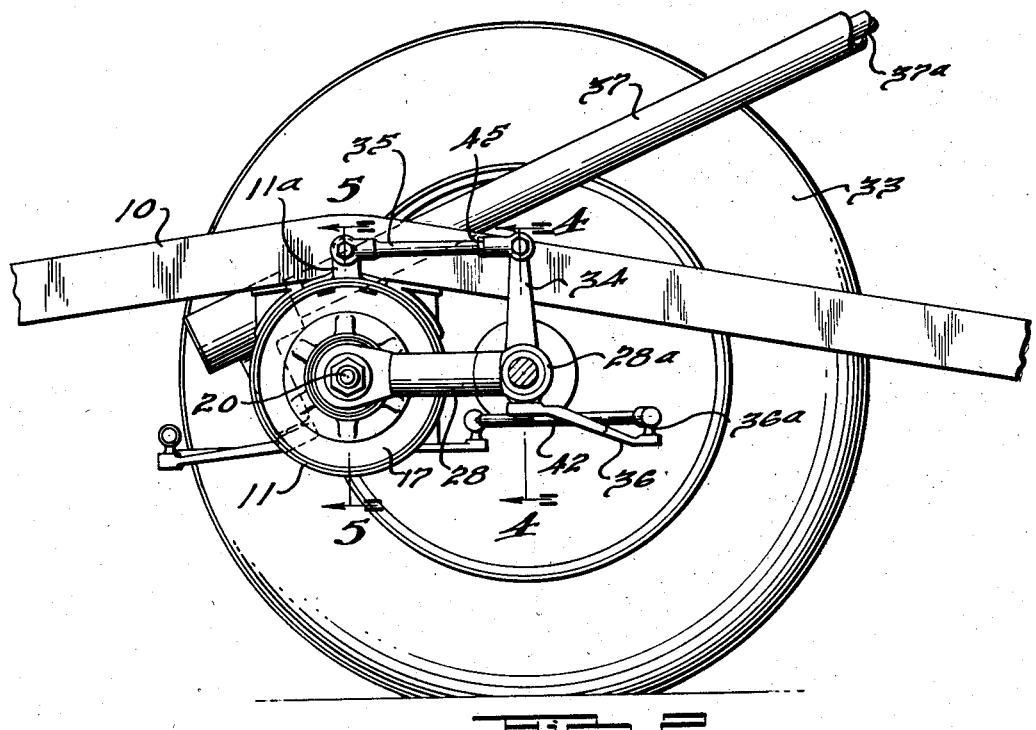
Fig. 2 is a view of the wheel suspension, taken on the line 2—2 of Fig. 1, looking in the direction of the arrows.
Figure 3:
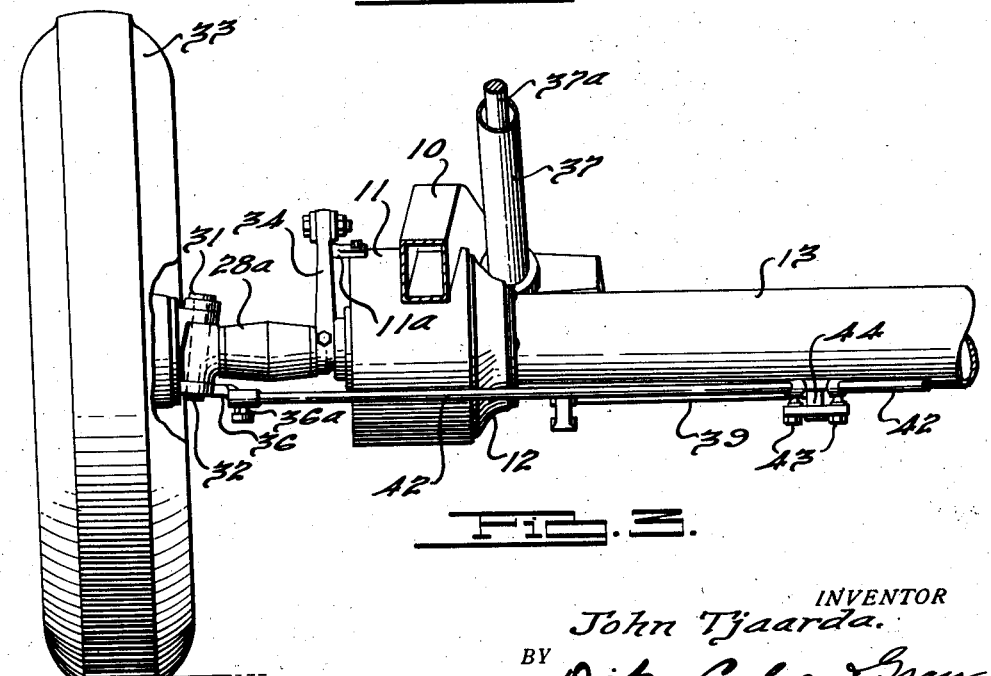
Fig. 3 is a view, partly in section, taken on the line 3—3 of Fig. 1, looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there is shown, by way of example, the front part of a motor vehicle chassis provided with a wheel suspension embodying the present invention. The drawings illustrate the invention as applied to the front or steering wheels. However, it will be understood that the invention may be successfully applied to the rear or driving wheels of a motor vehicle.

Referring to the drawings, the frame structure of the vehicle comprises spaced longitudinal sills or frame members 10 to which are rigidly secured in any suitable manner a pair of spring devices each comprising a cylindrical drum 11. Each drum is closed at its inner end by means of an annular pressed metal closure disk or cover plate 12. The plate 12 is dished inwardly at 12a and its outer annular rim flange 12b is telescoped into the end of the drum 11 and secured thereto as by spot welding. Two drums are provided, one at each side of the chassis, and these drums are rigidly secured together by means of a transverse tube 13 having end flange 13a abutting against the closed ends 12a of the drums and secured thereto as by rivets 14. Mounted within each drum within the inner closure member 12 thereof is a hub member or journal bracket 15 carrying a bearing such as a roller or needle bearing 16 having its central cylindrical opening arranged axially and centrally of the drum.

The outer open end of each drum 11 is adapted to be closed in the final assembly by means of a pressed metal closure plate or disk 17 which is dished inwardly to lie within the drum. Plate 17 has an outer horizontal rim flange 17a telescoped into the drum and adapted to be rigidly secured thereto as by spot welding. Engaging the outer face of the plate 17 is a collar 18 having an outwardly extending annular flange 18a radially slotted at intervals to receive a series of lugs or embossments 17b on the plate 17 by means of which the collar 18 and plate 17 are firmly coupled together against relative rotational movement. The collar has a shouldered recess fitted centrally with a taper roller bearing unit 19 having its central opening aligned with the opening in the bearing 16.

Within the bearings 16 and 19 is journaled a spindle or rock shaft 20, the inner end 20a of which is turned down or reduced to slidingly fit into the bearing 16. Upon the outer end of the spindle 20 is mounted the wheel carrying arm as hereinafter described.

Near the inner end 20a of the shaft 20 the latter is formed with a circumferentially arranged series of outwardly projecting lugs 20b fitting within recesses in the face of a collar 21 slidably fitted upon the shaft 20. The collar 21 as in the case of the collar 18 has a laterally extending annular flange 21a radially slotted at intervals to receive a series of lugs or embossments 22a on a plate or disk 22 by means of which the collar 21 and disk 22 are firmly coupled together against relative rotational movement. The plate or disk 22 is dished inwardly similarly to the plate 17 and each has a central aperture to receive the spindle or shaft 20 with suitable clearance therebetween.

Between the outer and inner concavo-convex plates 17 and 22 is a spring device adapted to resist resiliently rotative movements of the shaft 20. In the present embodiment of the invention said spring device comprises two annular doughnut-like members 23 and 24 made of resilient elastic material such as rubber. To the outer face of the rubber doughnut 23 is bonded a metal plate or disk 23a having a concavo-convex shape generally corresponding to the shape of the disk member 22 and engaged thereby over the major area thereof. In like manner there is bonded to the outer face of the rubber doughnut 24 a similar concavo-convex disk 24a engaged by the disk member 17. The disks or plates 23a and 24a are provided at intervals with outstanding lugs or embossments 23c and 24c respectively which fit into the recesses formed by embossments 22a and 17b and firmly interlock or couple the members together against relative rotational movement. To the adjacent inner or opposed faces of the doughnuts 23 and 24, which faces preferably extend in parallel planes normal to the axis of shaft 20, are bonded metal disks 23b and 24b respectively. These disks are preferably identical and have large central apertures as in the case of disks 23a and 24a freely receiving the shaft with suitable clearance therebetween. Interposed between disks 23b and 24b is a relatively thin metal coupling disk or ring 26 (see Fig. 6) which has radial notches or slots 26a cut inwardly from the outer edge thereof. The ring 26 carries a series of cylindrical coupling devices 25 of spool-like form, each device having an annular groove into which the edges of notches 26a slidingly fit. Thus, the coupling devices 25 are anchored in the notches of the retainer or coupling ring 26 and the heads of these devices in turn are seated within circular apertures in the plates 23b and 24b. In this manner the rubber doughnuts through disks or plates 23b, 24b and 26 and coupling devices 25 are drivingly connected together.

The members 23 and 24 are of a similar cross section having their outer faces converging toward the shaft 20, thus providing a better distribution of stresses in the rubber. The members 23 and 24 are put under initial compression in the process of assembly, thus causing bulging of the rubber as indicated at 27.

To the outer tapered end of the shaft 20 there is fastened the enlarged end 28a of an oscillating wheel-carrying arm 28. The outer face of this end portion 28a may be formed with a recess to receive a nut 60 screwed onto the threaded end 20b of the shaft 20 and by means of which the end 28a of the arm may be drawn up tightly on the shaft thereby holding the spring device under compression between the thrust bearing assembly 19 together with collar 18 and the driving lugs 20b and collar 21.

By virtue of the foregoing construction it will be seen that the spring device is secured at its inner end to the inner end of the shaft through the medium of coupling members 21 and 22 and driving pins or lugs 20b whereby it is constrained to rotate with the shaft. On the other hand the outer end of the spring device is anchored to the drum 11 and consequently to the sprung structure of the vehicle through the medium of disks 24a and 17. Rotation of the shaft 20 upon oscillation of wheel-carrying arm 28 causes torsional distortion of the rubber members 23 and 24 and hence such rotation is resiliently resisted.

Assembly of the parts within the drum 11 and relative adjustment thereof to vary as desired the angularity of the wheel carrying arm 28 may be readily and conveniently accomplished. With the rubber doughnuts and associated parts assembled upon the shaft the arm 28 and nut 60 are assembled. The rubber members may then be mechanically compressed to the desired degree and the nut screwed tightly in place thereby clamping the spring device in pre-compressed condition between the compression disks 17 and 23a, the latter in turn being held between collars 18 and 21. This assembly may then be inserted through the outer open end of the drum 11, the end 20a locating itself in the bearing 16 and the flange 17a fitting snugly into the outer end of the drum. This flange may then be welded to the drum or otherwise secured thereto.

The outer end of the oscillating wheel-carrying arm 28 is in the form of a sleeve 28a which carries a suitable bearing, in the present instance comprising two roller or needle bearing sections 29, in which there is journalled a spindle 30. The spindle 30 is provided with a hole for the kingpin 31 on which is pivoted a steering knuckle 32 carrying a steering wheel 33. The opposite end 30a of the spindle 30 carries a vertical link 34, the upper end of which is hingedly connected to the end of a horizontally extending link 35. The opposite end of said link 35 is hinged on a bracket 11a secured to the top of the drum 11, which is made sufficiently strong to receive the brake torque reaction. The link 35 may be formed in two endwise adjustable sections with a threaded connection 45 therebetween to permit adjustment of the length of the link.

By virtue of the above construction, the oscillating wheel-carrying arm 28, the links 34 and 35, in view of their connection to the vehicle structure, form what is known in the art as a four-bar linkage, the oscillating arm 28 and the link 35 representing the cranks of said linkage, the link 34 being a connecting rod thereof, while the fixed bar or crank of the linkage is formed by a sprung portion of the vehicle structure, in the present instance the fixed drum 11. The linkage is of the parallelogram type and therefore the parallel bars thereof retain their parallel relationship in spite of the movements of the linkage. In the present embodiment the arrangement of the parts of the linkage is such that the center line of the fixed crank is vertical and therefore the opposite link 34 also remains vertical in spite of rotation of the cranks 28 and 35.

On the steering knuckle 32 there is provided a steering arm 36. The steering system of the vehicle comprises a steering column 37 supporting a steering shaft 37a which may be of any suitable type. In the present embodiment the steering shaft 37a is connected at its lower end to a pitman arm 38 connected by means of a drag link 39 to a lever 40 hinged on the tube 13 as indicated at 41. The rear end of the lever is hingedly connected to an equalizer bracket 44 in turn pivoted at points 43 to two tie half-rods 42. The outer ends of the tie rods 42 are connected by means of ball and socket connections 36a to the steering arms 36.

It will now be clear from an examination of the drawings that as the wheel 33 moves up because of irregularities of the road, the ball 36a of the arm 36 moves in a path equi-distant from the point 43 at which the tie rod 42 is connected to equalizer bracket 44 carried by the lever 40. Therefore, the vertical movements of the wheel 33 cause the tie rod 42 to sweep a conical surface with the apex thereof being located at the point 43. Because of such an arrangement vertical movements of the wheel 33 do not cause rotation of the steering arm 36 around the kingpin 31, and therefore no change in the steering angle of the wheels is produced. Thus, with the aid of my improved wheel suspension cooperating with the above described steering linkage, steering of the vehicle is made steady and secure irrespective of the degree of roughness of the road.

In the present embodiment of the invention the wheels 33 are arranged substantially vertical while the kingpin 31 is arranged at an angle with the vertical and, consequently, at an angle with respect to the plane of the wheel. The angle which the kingpin 31 makes with the plane of the wheel is so selected that the center line of the kingpin intersects said plane under the ground line. By virtue of such a construction, the turning effort necessary for turning the wheels is decreased, and yet the substantially vertical arrangement of the wheels produces equal wear of the tire on both sides thereof.

From the foregoing it will be seen that there is provided by virtue of the present invention a rubber spring assembly attachable to each of the wheel carrying arms and rigidly connected together transversely of the vehicle and supported by the vehicle frame. The spring assemblies are of compact construction, capable of easy installation and designed to afford maximum protection to the rubber parts against deterioration. Although in the present embodiment parts 20b, 21 and 22a are separate members coupled together it will be understood that a single thrust collar may be substituted therefor, such collar being pinned or otherwise fastened to the shaft 20 and coupled to the lugs 23c in a manner similar to the connection between disks 22 and 23a.

The present spring device provides a spring suspension producing extremely improved riding characteristics. Disadvantages due to the use of leaf or coil springs and the consequent necessity of employing separate shock absorbers or snubbing devices, due to the sharp rebound of the metal springs by reason of energy stored up therein when the springs are deflected, are greatly minimized. In the present instance the relatively soft rubber members under distortion absorb energy by the development of heat, and the greater the impact the more energy is converted into heat. Moreover, the period of vibration of the rubber changes according to the speed with which the impulses follow one another. Hence, the rubber spring device constructed pursuant to the present invention produces desirable snubbing or shock absorbing effects not possible of achievement in conventional types of spring suspensions.

I claim:

1. In a wheel suspension device for a vehicle having a frame, a drum secured to the frame, a swinging wheel carrying arm having a spindle extending into said drum and journalled therein adjacent the inner end of the drum, a spring device comprising a plurality of annular rubber members housed within the drum and connected together at their adjacent faces, the inner end of said spring device being fixed with relation to the spindle and the outer end fixed with relation to the drum, said rubber members having their more remote sides converging toward the spindle and their adjacent connected faces substantially parallel, and means for detachably connecting said arm to the outer end of the spindle and for maintaining said rubber members under compression.

2. In a wheel suspension device for a vehicle having a frame, a drum secured to the frame, a swinging wheel carrying arm having a spindle extending into said drum and journalled therein adjacent the inner end of the drum, a spring device comprising a plurality of annular rubber members housed within the drum and connected together at their adjacent faces, the inner end of said spring device being fixed with relation to the spindle and the outer end fixed with relation to the drum, said rubber members having their more remote sides converging toward the spindle and their adjacent connected faces substantially parallel, and a pair of interconnected disk members adjacent each end of the spindle for holding said rubber members under compression.

3. In a wheel suspension device for a vehicle having a frame, a drum secured to the frame, a swinging wheel carrying arm having a spindle extending into said drum and journalled therein adjacent the inner end of the drum, a spring device comprising a plurality of annual rubber members housed within the drum and connected together at their adjacent faces, the inner end of said spring device being fixed with relation to the spindle and the outer end fixed with relation to the drum, said rubber members having their more remote sides converging toward the spindle and their adjacent connected faces substantially parallel, a pair of interconnected disk members adjacent each end of the spindle for holding said rubber members under compression, and abutment means relatively adjustable axially of the spindle for clamping said disk members in position.

4. In a wheel suspension device for a vehicle having a support, a swinging wheel carrying arm journalled in said support, a spring device fixed at one end to said support and connected at its opposite end to said arm, said device comprising a plurality of annular rubber members adapted to be subjected to torsional stresses, means for subjecting said members to compression in a direction axially of said members, the adjacent rubber members having bonded metallic surfaces, and a retainer member interposed between said surfaces and having coupling devices detachably connecting said surfaces together.

5. In a wheel suspension device for a vehicle having a support, a swinging wheel carrying arm journalled in said support, a spring device fixed at one end to said support and connected at its opposite end to said arm, said device comprising a plurality of annular rubber members adapted to be subjected to torsional stresses, means for subjecting said members to compression in a direction axially of said members, the adjacent rubber members having bonded metallic surfaces, and a retainer ring provided with detachable coupling devices interposed between said surfaces for connecting the same together.

6. In a wheel suspension mechanism for a vehicle having a drum, a swinging wheel carrying arm, a shaft journalled within and at opposite ends of the drum, a plurality of annular rubber members adapated to be subjected to torsional stresses mounted in the drum, said members having bonded metallic surfaces, compression members engageable with said rubber members, one connected to the shaft and one to the drum, and means for maintaining said compression members in position on said shaft to retain said rubber members under compression in a direction axially of the shaft, said compression members comprising concavo-convex disks detachably connected to metallic surfaces of the rubber members.

7. In a wheel suspension mechanism for a vehicle having a drum, a swinging wheel carrying arm, a shaft journalled within and at opposite ends of the drum, a plurality of annular rubber members adapted to be subjected to torsional stresses mounted in the drum, said members having bonded metallic surfaces, compression bere engageable with said rubber members, one connected to the shaft and one to the drum, and means for maintaining said compression members in position on said shaft to retain said rubber members under compression in a direction axially of the shaft, said rubber members having their more remote sides converging toward the shaft and their adjacent faces detachably connected together.

8. In a wheel suspension mechanism for a vehicle having a drum, a swinging wheel carrying arm, a shaft journalled within and at opposite ends of the drum, a plurality of annular rubber members adapted to be subjected to torsional stresses mounted in the drum, said members having bonded metallic surfaces, compression members engageable with said rubber members, one connected to the shaft and one to the drum, and means for maintaining said compression members in position on said shaft to retain said rubber members under compression in a direction axially of the shaft, said rubber members having their more remote sides converging toward the shaft and their adjacent faces substantially parallel and detachably connected together.

9. In a wheel suspension mechanism for a vehicle having a drum, a swinging wheel carrying arm, a shaft journalled within and at opposite ends of the drum, a plurality of annular rubber members adapted to be subjected to torsional stresses mounted in the drum, said members having bonded metallic surfaces, compression members engageable with said rubber members, one connected to the shaft and one to the drum, and means for maintaining said compression members in position on said shaft to retain said rubber members under compression in a direction axially of the shaft, said rubber members having their more remote sides converging toward the shaft and their adjacent faces spaced apart, and a coupling plate interposed between said faces and having means for detachably coupling the same together.

10. In a wheel suspension for a motor vehicle, a four-bar linkage having its fixed bar formed by the sprung structure of the vehicle, a wheel carrying spindle carried by one of the cranks of said linkage, the axis of said spindle coinciding with one of the hinge axes of said linkage, means for adjustably varying the length of the other crank of the linkage, a drum secured to the sprung vehicle structure, a shaft secured to one of the cranks of said linkage, said shaft extending into said drum and journalled therein, a spring device comprising a plurality of rubber members housed within the drum and adapted to resist resiliently the rotation of said shaft.

11. In a vehicle suspension for a motor vehicle, a drum secured to the sprung structure of the vehicle, a four-bar linkage having its fixed bar formed by the structure of said drum, a wheel carrying spindle carried by one of the cranks of said linkage, the axis of said spindle coinciding with one of the hinge axes of said linkage, a plurality of annular rubber members housed in said drum around said spindle and adapted to resist resiliently movements of said linkage.

12. In a vehicle suspension for a motor vehicle, a drum secured to the sprung structure of the vehicle, a four-bar linkage having its fixed bar formed by the structure of said drum, a wheel carrying spindle carried by one of the cranks of said linkage, the axis of said spindle coinciding with one of the hinge axes of said linkage, a spring device comprising a plurality of annular rubber members of substantially equal diameters, said members being coaxially arranged and adjacent members being drivingly connected, one end of said device being fixed with relation to the drum and the other end being drivingly connected to said spindle, whereby rotation of the spindle is resiliently resisted.

13. In a vehicle suspension for a motor vehicle, a drum secured to the sprung structure of the vehicle, a four-bar linkage having its fixed bar formed by the structure of said drum, a wheel carrying spindle carried by one of the cranks of said linkage, the axis of said spindle coinciding with one of the hinge axes of said linkage, a spring device comprising a plurality of annular rubber members of substantially equal diameters, said members being coaxially arranged with respect to one another and concentrically with respect to said spindle, and a metal disk bonded to each side of each rubber member, the disks of the adjacent members being drivingly connected together and one of the extreme disks being drivingly connected to said spindle while the opposite extreme disk is anchored on said drum.

JOHN TJAARDA.